United States Patent
Kim

(10) Patent No.: US 9,774,575 B2
(45) Date of Patent: Sep. 26, 2017

(54) SYSTEM AND METHOD FOR AUTHENTICATING USER BY NEAR FIELD COMMUNICATION

(71) Applicant: Data Locker Inc., Overland Park, KS (US)

(72) Inventor: Jeong Ki Kim, Goyang-si (KR)

(73) Assignee: DataLocker Inc., Overland Park, KS (US)

( * ) Notice: Subject to any disclaimer, the term of this patent is extended or adjusted under 35 U.S.C. 154(b) by 83 days.

(21) Appl. No.: 14/844,531

(22) Filed: Sep. 3, 2015

(65) Prior Publication Data
US 2017/0070490 A1    Mar. 9, 2017

(51) Int. Cl.
*H04L 29/06* (2006.01)
*G06F 21/35* (2013.01)

(52) U.S. Cl.
CPC .............. *H04L 63/06* (2013.01); *G06F 21/35* (2013.01)

(58) Field of Classification Search
CPC ................................ H04L 63/06; G06F 21/35
USPC ............................................................ 726/9
See application file for complete search history.

(56) References Cited

U.S. PATENT DOCUMENTS

| 2010/0332028 A1* | 12/2010 | Hilpipre | ................ | G07B 15/00 700/237 |
| 2012/0124370 A1* | 5/2012 | Choi | ..................... | H04L 63/067 713/159 |
| 2014/0040128 A1* | 2/2014 | Park | ..................... | G06Q 20/108 705/42 |

FOREIGN PATENT DOCUMENTS

| KR | 1009442460000 | 2/2010 |
| KR | 1010688970000 | 9/2011 |

* cited by examiner

*Primary Examiner* — Michael S McNally
(74) *Attorney, Agent, or Firm* — Hovey Williams LLP

(57) ABSTRACT

A system and method for authenticating a user by near field communication. The system for authenticating a user by near field communication includes a security device performing user authentication by using a Universal Subscriber Identity Module (USIM) ID and a password both being transmitted through near field communication in response to an authentication request, and a mobile device transmitting the USIM ID and password through near field communication.

7 Claims, 3 Drawing Sheets

SYSTEM AND METHOD FOR AUTHENTICATING USER BY NEAR FIELD COMMUNICATION

BACKGROUND

1. Field of the Invention

The present invention relates to a system and method for authenticating a user by near field communication and, more particularly, to a system and method for authenticating a user by near field communication that can perform user authentication through near field communication between a security device and a mobile device by using a Universal Subscriber Identity Module identification (USIM ID) and a password, which is inputted to a mobile application (mobile app).

2. Discussion of the Related Art

A security device may perform user authentication by inputting a password through a key inputting device, which is installed in the security device itself. Alternatively, the security device may perform user authentication by using devices, such as Radio Frequency Identification (RFID) tag recognition or fingerprint recognition devices, keys, and so on.

However, such security devices and user authentication methods have problems and disadvantages of having the password be exposed, be duplicated, fail to be recognized, be lost, and so on.

Accordingly, the development of a technology for reinforcing security in the respective field of technology is required.

SUMMARY

Embodiments of the present invention comprise a system for authenticating a user by near field communication. The system includes a security device performing user authentication by using a Universal Subscriber Identity Module (USIM) ID and a password both being transmitted through near field communication in response to an authentication request, and a mobile device transmitting the USIM ID and password through near field communication.

Embodiments of the present invention additionally include a method for authenticating a user by near field communication. The method includes, after pairing a security device and a mobile device, a step of transmitting a USIM ID request signal from the security device to the mobile device. The method includes an additional step of determining in the security device whether or not a USIM ID being transmitted from the mobile device is identical to a predetermined USIM ID stored in the security device. The method includes an additional step of transmitting a password request signal from the security device to the mobile device. The method includes an additional step of determining in the security device whether or not a password being transmitted from the mobile device is identical to a predetermined password stored in the security device. The method further includes, when the authentication using the USIM ID and the password is completed, a step of realizing a driving of the security device.

It is to be understood that both the foregoing general description and the following detailed description of the present invention are exemplary and explanatory and are intended to provide further explanation of the invention as claimed.

BRIEF DESCRIPTION OF THE DRAWING FIGURES

The characteristics and advantages of the present invention may be understood more easily with the detailed description of the exemplary embodiments of the present invention, which will hereinafter be provided, along with the accompanying drawings, which will be briefly described as follows. In the drawings.

DETAILED DESCRIPTION OF THE INVENTION

Hereinafter, the system and method for authenticating a user by near field communication of the present invention will be described in more detail with reference to the accompanying drawings.

Moreover, in describing the present invention, in case any one component 'transmits' data or a signal to another component, this may indicate that the any one component directly transmits the data or signal to the other component, or that the any one component transmits the data or signal to the other component through at least one or more other components.

Figure 1:
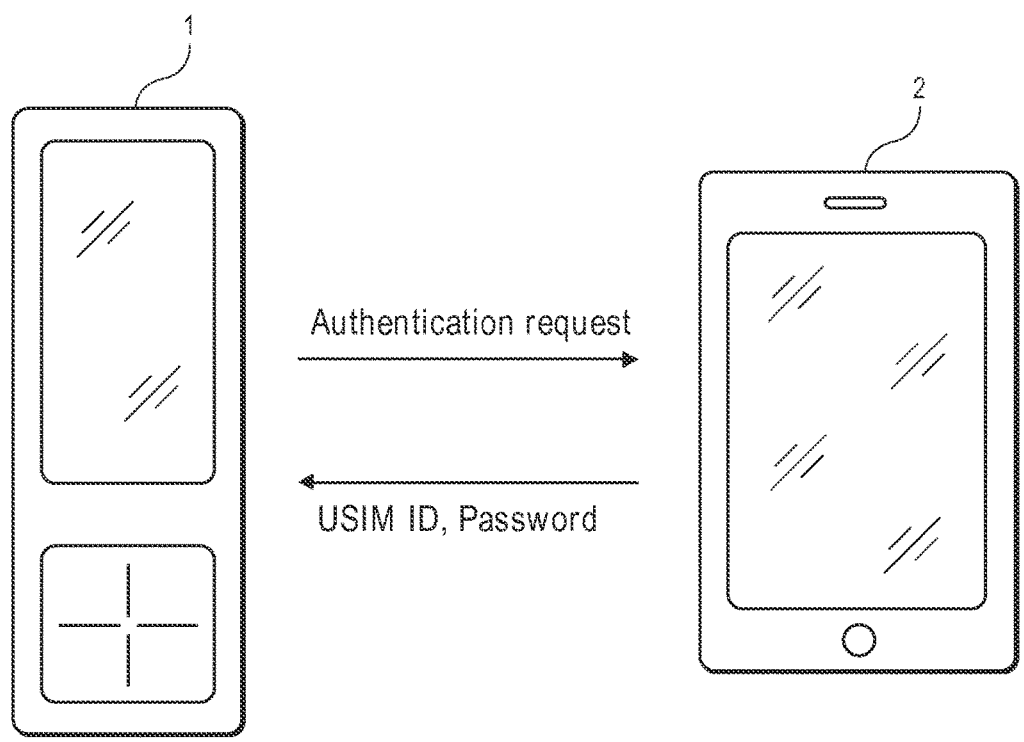
FIG. 1 illustrates a schematic diagram of a system for authenticating a user by near field communication according to an embodiment of the present invention.

FIG. 1 illustrates a schematic diagram of a system for authenticating a user by near field communication according to an embodiment of the present invention.

Referring to FIG. 1, the system for authenticating a user by near field communication according to the present invention includes a security device 1 requesting for an authentication and performing user authentication by using a Universal Subscriber Identity Module (USIM) identification ID and a password, which are transmitted through near field communication, and a mobile device 2 transmitting the USIM ID and the password through short-range wireless communication (or near field communication).

Herein, the short-range wireless communication (or near field communication) may select and use any one of Near Field Communication (NFC), Wi-Fi, Zigbee communication, ISA100, WirelessHART, Bluetooth, and Wave. In certain embodiments, considering the technical scope and spirit of the present invention, it may be preferable to use NFC as the short-range wireless communication.

In the system for performing user authentication by near field communication according to the present invention, which is configured to have the above-described structure, the security device 1 requests for a USIM ID from the mobile device 2, when the security device 1 and the mobile device 2 access (or approach) an area in which wireless communication is available. Accordingly, the mobile device 2 transmits its USIM ID (as may be stored on the USIM of the mobile device 2) to the security device 1 through near field communication. Subsequently, the security device 1 performs a primary authentication by verifying the transmitted USIM ID, and, then, the security device 1 requests for the password from the mobile device 2. Accordingly, a mobile app allowing a password to be manually inputted in the mobile device 2 is executed, and, then, as a response to the user's act of inputting the password, the mobile device 2 transmits the password to the security device 1. Thereafter, the security device 1 performs secondary authentication by verifying the transmitted password, and, then, the security device 1 transmits the authentication result to the mobile device 2. Meanwhile, when the secondary authentication is completed, the security device 1 is driven (or operated), and, then, the security device 1 is maintained in a stand-by state for a predetermined period of time. In the mobile device 2, a mobile app, which is configured to control the security device 1, is executed in accordance with the authentication result, thereby allowing the user to use functions of the security device 1 he (or she) wishes to use.

Figure 2:
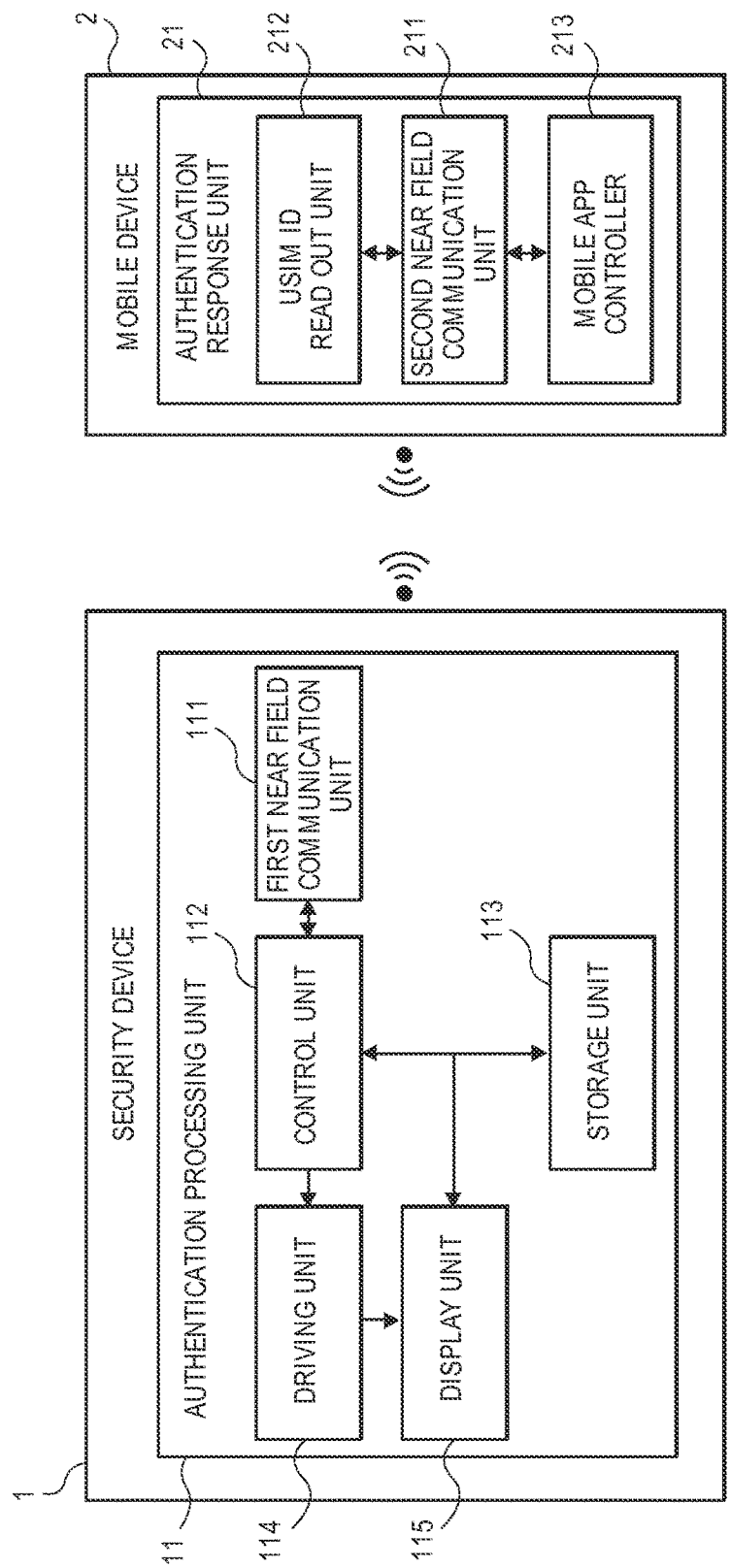
FIG. 2 illustrates a block diagram of a system for authenticating a user by near field communication according to an embodiment of the present invention.

FIG. 2 illustrates a block diagram of a system for authenticating a user by near field communication according to an embodiment of the present invention.

Referring to FIG. 2, the security device 1 includes a device performing unique functions respective to the security device 1, and an authentication processing unit 11 processing authentication with the mobile device 2. And, the mobile device 2 includes a device performing unique functions respective to the mobile device 2, and an authentication response unit 21 responding to an authentication request.

First of all, the authentication processing unit 11 includes a first near field communication unit 111 performing near field communication (or short-range wireless communication) with the mobile device 2, a control unit 112 determining by comparing the USIM ID and password, which are transmitted from the mobile device 2, and, then, generating a control signal for driving the security device 1 and for executing a mobile app, a storage unit 113 storing predetermined USIM ID and password therein and storing a Read Mode program performing selective comparison respective to the USIM ID and the password, a driving unit 114 driving the security device 1 in response to the control signals, and a display unit 115 outputting an authentication processing procedure and its status.

Herein, the display unit 115 of the authentication processing unit 11 may be optionally configured, and a display unit provided in the security device 1 itself may also be used herein.

The authentication response unit 21 includes a second near field communication unit 211 performing near field communication (or short-range wireless communication) with the security device 1, a USIM ID read out unit 212 reading out the USIM ID and delivering the read out USIM ID to the near field communication unit, and a mobile app controller 213 inputting a password and executing a mobile app corresponding to the security device 1.

Herein, the security device 1 refers to a wide range of products requiring security, and examples of the security device 1 may include Door Locks, Personal Computers, Data Storage devices, POS Terminals, Set Top Boxes, Internet Protocol Television (IPTV), Smart TV, Audio Players, and so on.

Additionally, the mobile device 2 refers to a wide range of products including a wired terminal (or user equipment) or a wireless terminal (or user equipment), and examples of the mobile device 2 may include Smart Phones, Smart Pads, Tablet PCs, Personal Computers, POS Terminals, and so on.

The security device 1 and/or the mobile device 2 may each include a processing element and associated memory elements, such as storage unit 113 in security device 1. The processing elements may implement operating systems, and may be capable of executing computer programs, which are also generally known as instructions, commands, software code, executables, applications ("apps" or "mobile apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. The mobile app(s) of embodiments of the present invention may be implemented as computer program(s) that comprises a plurality of code segments executable by a computing device for performing the steps of the method of the present invention. The computer program, system, and method of embodiments of the present invention may be implemented in hardware, software, firmware, or combinations thereof using the system described herein.

In the system for authenticating a user by near field communication, which is configured as described above, the security device 1 periodically searches whether or not a mobile device 2 exists within a wireless communication area, and, when a responding mobile device 2 exists, the control unit 112 requests for an authentication through the first near field communication unit 111. Accordingly, the mobile device 2 transmits a USIM ID and a password to the first near field communication unit 111 of the security device 1 through the second near field communication unit 211, and the control unit 112 determines by comparison whether or not the transmitted USIM ID and password match with (or identical to) predetermined USIM ID and password, which are stored in the storage unit 113, by executing a Read Mode program. When the authentication is completed, the control unit 112 transmits a driving control signal to the driving unit 114, and, accordingly, the driving unit 114 drives (or operates) the security device 1. The above-described series of process steps are outputted to the display unit 115 of the security device 1. Meanwhile, when the driving of the security device 1 is realized, the control unit 112 transmits a mobile app control signal for executing a mobile app of the corresponding security device 1 to the second near field communication unit 211 through the first near field communication unit 111. Accordingly, the mobile app controller 213 of the mobile device 2 executes a mobile app corresponding to the mobile app control signal. A user of the mobile device 2 may control the security device 1 through the mobile app.

Hereinafter, a method for authenticating a user by near field communication according to the present invention by using the system, which is configured as described above, will be described in detail.

Figure 3:
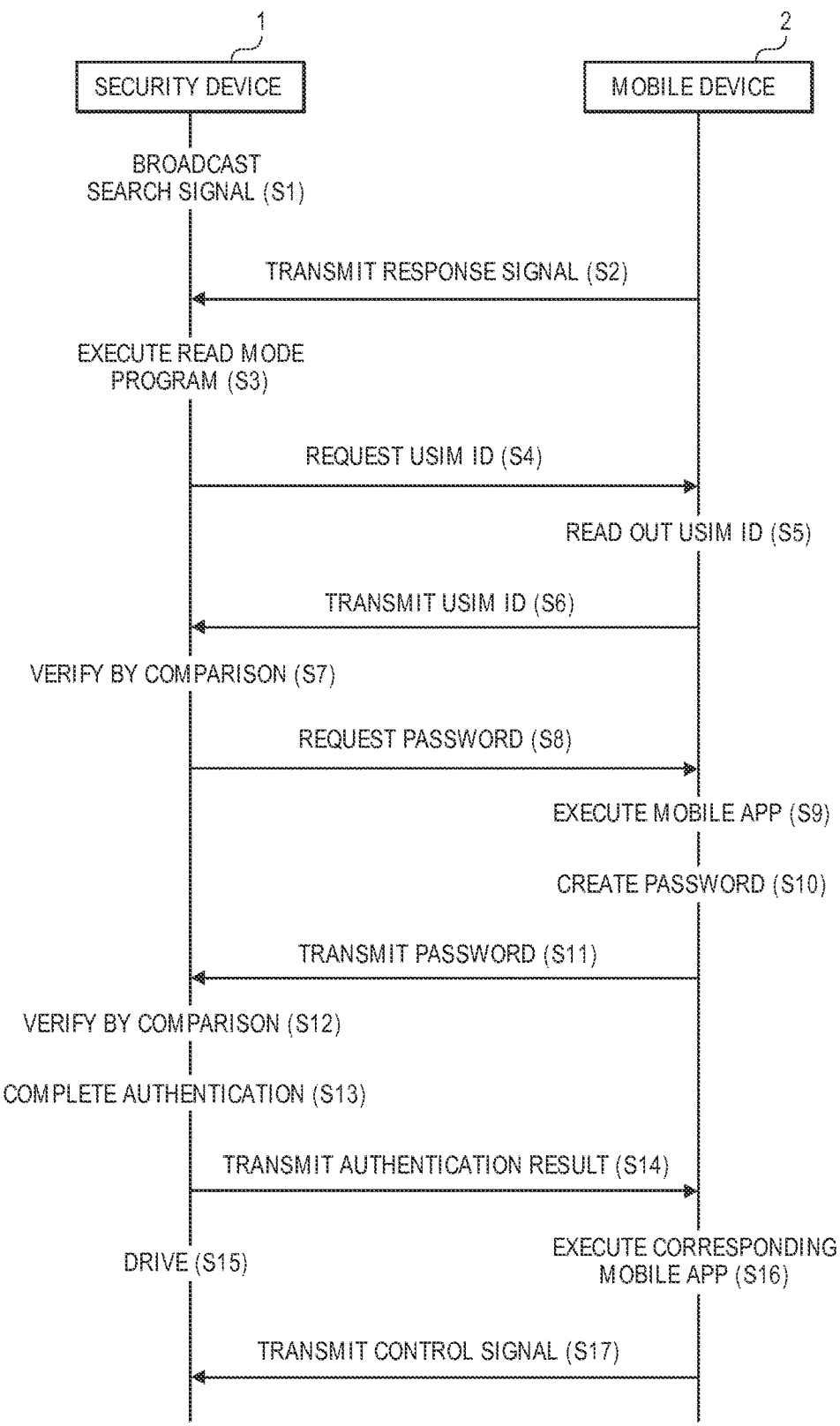
FIG. 3 illustrates a flow chart showing process steps of a method for authenticating a user by near field communication according to an embodiment of the present invention.

FIG. 3 illustrates a flow chart showing process steps of a method for authenticating a user by near field communication according to an embodiment of the present invention.

Referring to FIG. 3, the security device 1 periodically broadcasts a search signal (S1).

If a mobile device 2 exists within a wireless communication area, the mobile device 2 transmits a response signal to the security device 1 in response to the search signal (S2).

Accordingly, a pairing procedure between the security device 1 and the module device 2 is carried out, and, when the pairing is completed, the security device 1 executes a Read Mode program (S3) and, then, transmits a USIM ID request signal to the mobile device 2 as a first mode of the Read Mode program (S4).

The mobile device 2 reads out a USIM ID (S5) and, then, transmits the read out USIM ID to the security device 1 (S6).

Accordingly, the security device 1 verifies whether or not the transmitted USIM ID and a predetermined USIM ID are identical to one another (S7).

If the USIM IDs are identical to (or match) one another, the security device 1 transmits a password request signal to the mobile device 2 as a second mode of the Read Mode program (S8).

Accordingly, the mobile device 2 executes a mobile app in response to the password request signal (S9), and, then, the mobile device 2 transmits a password inputted through the mobile app to the security device 1 (S10 to S11).

Thereafter, the security device 1 verifies whether or not the transmitted password and a predetermined password are identical to one another (S12).

If the passwords are identical to one another, the security device 1 completes the authentication (S13) and, then, the security device 1 transmits the authentication result to the mobile device 2 (S14).

Meanwhile, when the authentication is completed, the driving of the security device 1 is realized (S15), and, at the same time, the execution of a mobile app for controlling the security device 1 is executed in the mobile device 2 (S16).

Accordingly, the control of the security device 1 may be realized in the mobile device 2 through the mobile app (S17).

Meanwhile, if the transmitted USIM ID and the predetermined USIM ID are not identical to one another (or if the transmitted USIM ID and the predetermined USIM ID do not match), or if the transmitted password and the predetermined password are not identical to one another (or if the transmitted password and the predetermined password do not match), retransmission may be requested, and, if a maximum tolerable number of trials is exceeded, an authentication failure may be notified.

Furthermore, in case the authentication process is completed, or in case a control signal is not generated from the mobile device 2 for a predetermined period of time, it will be preferable to end the pairing in order to prevent the system from being hacked (or breached). Evidently, if a control signal is generated from the mobile device 2, the respective control may be performed immediately without having to carry out an additional authentication procedure.

Meanwhile, it is preferable that a mobile app for inputting passwords remembers the password respective to each security device, and it is also preferable that the authentication is realized only by having the user select the corresponding password. This is devised for a case when the password respective to a specific security device cannot be remembered.

Additionally, it is preferable that a mobile app for controlling the security device 1 corresponds to a same program as a mobile app for inputting passwords.

In this exemplary embodiment, although a case of performing authentication by using a USIM ID and a password is given as an example, it is preferable to selectively perform user authentication by performing authentication using only the USIM ID, or by performing authentication using only the password, or by performing authentication using both the USIM ID and the password with respect to configuration settings of the Read Mode program.

Meanwhile, when initially purchasing the security device 1, an initial password is provided to the security device 1 in order to allow the security device 1 to be registered to the mobile device 2. Accordingly, a process of changing the password in the mobile device 2 by accessing the mobile device 2 using the initially provided password may be carried out. Additionally, in case the security device 1 is transferred to another user, the previous (or earlier) user shall provide the password to the new user so that the new user can change the password. When changing the password, the initial USIM ID is deleted, and a newly identified USIM ID (e.g., corresponding to the new user's mobile device) shall be registered along with the new password. In more detail, when changing a password of the security device 1, such as the password that was provided at an initial point of purchase, the changed password of the new user and a new USIM ID of the new paired mobile device are both registered to the security device 1. As such, the new mobile device can access and drive the security device 1.

As described above, by allowing the security device 1 to be driven (or operated) only when two unique numbers match one another through a USIM ID of the mobile device 2, which is difficult to be duplicated, and through a password management application (or app), which is installed in the mobile device 2, a technology that can safely protect the user's asset may be provided more effectively.

As described above, the system and method for authenticating a user by near field communication according to the present invention have the following advantages. Since the USIM ID that is attached to the mobile device is encoded by using an algorithm that is difficult to be duplicated, and since a password is transmitted by using a mobile app, the user authentication respective to the security device may be reinforced.

Additionally, according to the present invention, since a separate key inputting device for inputting passwords is not required to be installed or connected to the security device, the security device may be realized in a compact size, and the external features of the security device may become more simplified.

Finally, according to the present invention, since the usage of another person resulting from theft and, so on, of the security device cannot be carried out, leakage or damage of the user's asset (or personal information) may be prevented in advance, and the user's asset may be safely protected.

Given the above, embodiments of the present invention are directed to a system and method for authenticating a user by near field communication that substantially obviates one or more problems due to limitations and disadvantages of the related art.

For instance, an object of the present invention is to provide a system and method for authenticating a user by near field communication that can reinforce user authentication respective to a security device, by performing user authentication through near field communication between a security device and a mobile device by using a USIM ID and a password, which is inputted to a mobile application.

Additional advantages, objects, and features of the invention were set forth in part in the above description may be apparent to those having ordinary skill in the art upon examination of the above or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for authenticating a user by near field communication includes a security device performing user authentication by using a USIM ID and a password both being transmitted through near field communication in response to an authentication request, and a mobile device transmitting the USIM ID and password through near field communication.

The security device includes a device performing unique functions respective to the security device, and an authentication processing unit processing authentication with the mobile device, with the authentication processing unit including a first near field communication unit performing near field communication with the mobile device, a control unit determining by comparing the USIM ID and password both being transmitted from the mobile device and generating a control signal for driving the security device and for executing a mobile app, a storage unit storing a predetermined USIM ID and a predetermined password therein, and storing a Read Mode program for determining by comparing the USIM ID and password, and a driving unit driving the security device in response to a respective control signal.

The mobile device includes a device performing unique functions respective to the mobile device, and an authentication response unit responding to the authentication request, with the authentication response unit including a second near field communication unit performing near field communication with the security device, a USIM ID read out unit reading out a USIM ID and delivering the read out USIM ID to the second near field communication, and a mobile app controller inputting a password and executing a mobile app corresponding to the security device.

Meanwhile, according to the present invention, a method for authenticating a user by near field communication, includes, after pairing a security device and a mobile device, a step of transmitting a USIM ID request signal from the security device to the mobile device, a step of determining in the security device whether or not a USIM ID being transmitted from the mobile device is identical to a predetermined USIM ID stored in the security device, a step of transmitting a password request signal from the security device to the mobile device, a step of determining in the security device whether or not a password being transmitted from the mobile device is identical to a predetermined password stored in the security device, and, when authentication using the USIM ID and the password is completed, a step of realizing a driving of the security device (e.g., controlling functionality of the security device).

It may be preferable to execute a mobile app in response to the password request signal, and to transmit a password being inputted through the mobile app to the security device. Additionally, when the authentication is completed, it may be preferable to transmit an authentication result from the security device to the mobile device, and to execute a mobile app for controlling the corresponding security device in the mobile device in response to the authentication result. At this point, it may be preferable that the mobile app for controlling the corresponding security device and the mobile app being executed in response to the password request signal correspond to the same computer program.

Because the USIM ID embedded in the mobile device is encoded by using an algorithm that is difficult to be duplicated, and, also, since the password is transmitted by using the mobile app, user authentication respective to the security device may be reinforced.

Embodiments of the present invention have been provided above, and it will be apparent to those skilled in the art that various modifications and variations can be made in the present invention without departing from the spirit or scope of the inventions.

Accordingly, the above-described embodiments of the present invention shall be understood only as exemplary embodiments that do not limit the scope of the present invention. Thus, it is intended that the present invention covers the modifications and variations of this invention provided they come within the scope of the appended claims and their equivalents.

What is claimed is:

1. A system for authenticating a user by near field communication, comprising:
   a security device that includes a first non-transitory computer readable medium with a program stored thereon for instructing a processing element of the security device to perform the following—
      determine that a mobile device is in near-field communication range,
      upon determining that the mobile device is in near field communication range, pair with the mobile device,
      after pairing with the mobile device, receive, via a first near field communication unit, a USIM ID transmitted from the mobile device,
      determine whether or not the USIM ID transmitted from the mobile device is identical to a predetermined USIM ID stored in the security device,
      receive, via the first near-field communication unit, a password transmitted from the mobile device,
      determine whether or not the password transmitted from the mobile device is identical to a predetermined password stored in the security device,
      upon authenticating the USIM ID and the password, permit the mobile device to control functionality of the security device; and
   a mobile device that includes a second non-transitory computer readable medium with a program stored thereon for instructing a processing element of the mobile device to perform the following—
      after pairing with the security device, transmit, via a second near field communication unit, the USIM ID and the password to the security device,
      control functionality of the security device.

2. The system of claim 1, wherein the program on said second non-transitory computer readable medium of said mobile device
   comprises a mobile app for controlling the functionality of the security device.

3. A method for authenticating a user by near field communication, comprising:
   determining that a mobile device is in near field communication range of a security device;
   upon determining that the mobile device is in near field communication range of the security device, pairing the security device and the mobile device;
   after pairing the security device and the mobile device, transmitting a USIM ID request signal from the security device to the mobile device;
   receiving a USIM ID transmitted from the mobile device to the security device;
   determining in the security device whether or not the USIM ID transmitted from the mobile device is identical to a predetermined USIM ID stored in the security device;
   transmitting a password request signal from the security device to the mobile device;
   receiving a password transmitted from the mobile device to the security device;
   determining in the security device whether or not the password transmitted from the mobile device is identical to a predetermined password stored in the security device; and when authentication using the USIM ID and the password is completed, realizing a driving of the security device, wherein said realizing the driving of the security device includes controlling functionality of the security device by the mobile device.

4. The method of claim 3, wherein a mobile app is executed in response to the password request signal, and wherein a password being inputted through the mobile app is transmitted to the security device.

5. The method of claim 4, wherein, when the authentication is completed, an authentication result is transmitted from the security device to the mobile device, and wherein a mobile app for controlling the corresponding security device is executed in the mobile device in response to the authentication result.

6. The method of claim 5, wherein the mobile app for controlling the corresponding security device and the mobile app being executed in response to the password request signal correspond to the same mobile app.

7. A method for authenticating a user by short-range wireless communication, comprising:

determining that a mobile device is in short-range wireless communication range of a security device;

upon determining that the mobile device is in short-range wireless communication range of the security device, pairing the security device and the mobile device;

after pairing the security device and the mobile device, receiving a USIM ID transmitted from the mobile device to the security device;

determining in the security device whether or not the USIM ID transmitted from the mobile device is identical to a predetermined USIM ID stored in the security device;

receiving a password transmitted from the mobile device to the security device;

determining in the security device whether or not the password transmitted from the mobile device is identical to a predetermined password stored in the security device; and when authentication using the USIM ID and the password is completed, realizing a driving of the security device, wherein said realizing the driving of the security device includes permitting the mobile device to control functionality of the security device.

* * * * *

UNITED STATES PATENT AND TRADEMARK OFFICE
CERTIFICATE OF CORRECTION

Page 1 of 1

| | |
|---|---|
| PATENT NO. | : 9,774,575 B2 |
| APPLICATION NO. | : 14/844531 |
| DATED | : September 26, 2017 |
| INVENTOR(S) | : Jeong Ki Kim |

It is certified that error appears in the above-identified patent and that said Letters Patent is hereby corrected as shown below:

On the Title Page

The Applicant is currently listed as "Data Locker Inc.". The correct listing of the Applicant's name is "DataLocker Inc.".

Signed and Sealed this
Twenty-sixth Day of December, 2017

Joseph Matal
*Performing the Functions and Duties of the
Under Secretary of Commerce for Intellectual Property and
Director of the United States Patent and Trademark Office*